United States Patent
Usui et al.

(10) Patent No.: US 8,824,251 B2
(45) Date of Patent: Sep. 2, 2014

(54) LIBRARY APPARATUS

(71) Applicants: Hitachi-LG Data Storage, Inc., Tokyo (JP); Hitachi Consumer Electronics Co., Ltd., Tokyo (JP)

(72) Inventors: Shimpei Usui, Yokohama (JP); Masayuki Kobayashi, Kuki (JP); Toshihiro Kato, Tokyo (JP)

(73) Assignees: Hitachi-LG Data Storage, Inc., Tokyo (JP); Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/771,438

(22) Filed: Feb. 20, 2013

(65) Prior Publication Data

US 2013/0223197 A1 Aug. 29, 2013

(30) Foreign Application Priority Data

Feb. 29, 2012 (JP) ................................. 2012-042747

(51) Int. Cl.
*G11B 17/22* (2006.01)
*G11B 27/36* (2006.01)
*G11B 17/04* (2006.01)

(52) U.S. Cl.
CPC .............. *G11B 17/04* (2013.01); *G11B 17/225* (2013.01); *G11B 17/228* (2013.01)
USPC ..................................... 369/30.38; 369/53.2

(58) Field of Classification Search
None
See application file for complete search history.

(56) References Cited

U.S. PATENT DOCUMENTS

| | | | | |
|---|---|---|---|---|
| 5,684,766 A | * | 11/1997 | Inoue et al. ................. | 369/30.63 |
| 5,982,719 A | * | 11/1999 | Nishijima et al. ......... | 369/30.32 |
| 2005/0162991 A1 | * | 7/2005 | Matsuura .................... | 369/30.27 |
| 2006/0072380 A1 | * | 4/2006 | Fujiwara et al. ........... | 369/30.01 |
| 2007/0086283 A1 | * | 4/2007 | Hayashi ..................... | 369/30.07 |
| 2011/0299369 A1 | * | 12/2011 | Mutsuro et al. ............ | 369/30.06 |
| 2013/0077454 A1 | * | 3/2013 | Shimoda .................... | 369/30.06 |
| 2013/0100786 A1 | * | 4/2013 | Nishida ...................... | 369/30.06 |
| 2013/0201809 A1 | * | 8/2013 | Hayashi ..................... | 369/53.15 |

FOREIGN PATENT DOCUMENTS

JP 7-326166 12/1995

* cited by examiner

*Primary Examiner* — Thang Tran
(74) *Attorney, Agent, or Firm* — Antonelli, Terry, Stout & Kraus, LLP.

(57) ABSTRACT

In a library apparatus, it is not considered that eliminated is an operation for reversing a direction of a double-sided readable/writable recording medium. In the library apparatus having a function of transporting and loading a recording medium from a recording medium storage unit to a recording and reproducing unit through a recording medium transportation unit, a direction in which an unrecorded recording medium is first loaded in the recording and reproducing unit is afterward treated as a front surface, and a direction opposite to the above direction is treated as a rear surface.

7 Claims, 8 Drawing Sheets

| RECORDING MEDIUM ID | RECORDING STATUS OF RECORDING MEDIUM | | RECORDING MEDIUM STORAGE UNIT ID | RECORDING MEDIUM POSITION INFORMATION |
|---|---|---|---|---|
| | FRONT SURFACE | REAR SURFACE | | |
| 1 | RECORDED | RECORDED | 1 | 1 |
| 2 | RECORDED | UNRECORDED | 1 | 2 |
| 3 | UNRECORDED | UNRECORDED | 1 | 3 |
| --- | --- | --- | --- | --- |

LIBRARY APPARATUS

INCORPORATION BY REFERENCE

The present application claims priority from Japanese application JP2012-042747 filed on Feb. 29, 2012, the content of which is hereby incorporated by reference into this application.

BACKGROUND OF THE INVENTION

The present invention relates to a library apparatus.

As a background art of this technical field, JP-A-07-326166 is disclosed. In JP-A-07-326166, at the time of treating a double-sided readable/writable recording medium, there is disclosed "since directions of front and rear surfaces are also set so as to reduce the necessity of reversing it, the trouble of specifying storage positions one by one through a user is saved."

SUMMARY OF THE INVENTION

In JP-A-07-326166, storage of a recording medium is controlled so as to reduce an operation for reversing a direction of the recording medium as much as possible, but it is not primarily considered that the reverse operation is eliminated.

In view of the foregoing, it is an object of the present invention to provide a library apparatus in which a double-sided readable/writable recording medium can be used without reversal until loading itself from a recording medium storage unit to a recording and reproducing unit, and in which data is easily recorded and reproduced on and from the double-sided readable/writable recording medium without reallocating addresses.

A method for arranging and loading a drive of a library used in an archive device is devised to attain the above-described object.

According to the present invention, in the library apparatus, until loaded from a recording medium storage unit up to a recording and reproducing unit, the double-sided readable/writable recording medium can be used without reversal.

Other objects, configurations and advantages of the invention will become apparent from the following description of the embodiments of the invention taken in conjunction with the accompanying drawings.

Other objects, features and advantages of the invention will become apparent from the following description of the embodiments of the invention taken in conjunction with the accompanying drawings.

DESCRIPTION OF THE EMBODIMENTS

Hereinafter, preferred embodiments of the present invention will be described with reference to the accompanying drawings of the embodiments.

First Embodiment

The first embodiment is an embodiment in the case of treating a double-sided readable/writable recording medium in a library apparatus having a function of transporting a recording medium from a recording medium storage unit to a recording and reproducing unit for loading through a recording medium transportation unit.

The library apparatus is used in a backup for the purpose of protecting data recorded on a server or a disk array device etc., or an archive for the purpose of safely storing the data over a long period of time.

Figure 1:
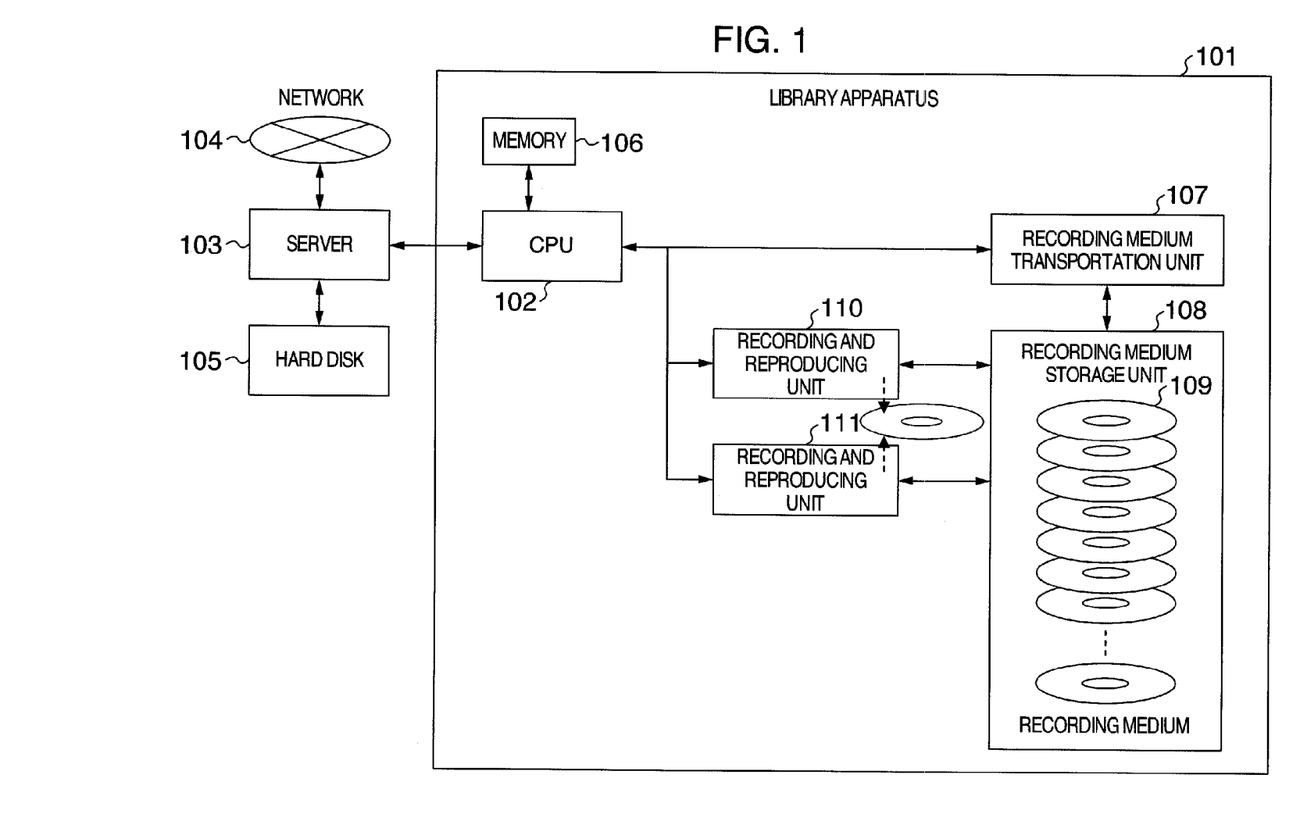
FIG. 1 is a block diagram illustrating a configuration of a library apparatus.

FIG. 1 is a block diagram illustrating a configuration of the library apparatus. At the time of recording, the library apparatus 101 receives data from a network 104, accumulates it in a hard disk 105 via a server 103, and records the accumulated data on the recording medium 109. At the time of reproducing, the library apparatus 101 reproduces data from the hard disk 105 or recording medium 109 and transmits it to the network 104 via the server 103. The server 103 controls the library apparatus through communication with a built-in CPU (Central Processing Unit) 102 of the library apparatus 101, and at the same time, controls the hard disk 105 and performs data management such as recording and reproduction of data or transmission and reception of data via the network 104. The hard disk 105 stores data transmitted from the network 104 while controlled by the server 103. The hard disk 105 may be further configured singly or plurally. A disk array device may further include a plurality of hard disks.

Examples of the recording medium 109 include an optical disk as represented by a BD-R (Blu-ray Disc Recordable). The recording medium 109 can further record and reproduce data on and from both surfaces of front and rear surfaces. Further, the recording medium 109 may be a recording medium such as a magnetic optical disk and a hologram. In the embodiment, the recording medium 109 is described below as a front surface and a rear surface and, needless to say, the front and rear surfaces thereof may be described as an A surface and a B surface.

A plurality of the recording media 109 are stored in a recording medium storage unit 108. In FIG. 1, the recording medium storage unit 108 is illustrated only singly, and further may be built in the library apparatus 101 in plurality. For example, the recording medium storage unit 108 may be used as usage, for example, one is an unrecorded recording medium storage device, and the other is a recorded recording medium storage device. Needless to say, the inside of the recording medium storage unit 108 may be divided into an unrecorded recording medium storage area and a recorded recording medium storage area.

When data is recorded, the recording medium 109 is taken out from the recording medium storage unit 108 by the recording medium transportation unit 107 and is loaded in recording and reproducing units 110 and 111. When data recording is finished, the recording medium 109 is returned to the recording medium storage unit 108 by the recording medium transportation unit 107. On the other hand, when data is reproduced, the recording medium 109 is taken out from the recording medium storage unit 108 by the recording medium transportation unit 107 and is loaded in the recording and reproducing units 110 and 111. Through the process, the data is reproduced. When data reproduction is finished, the recording medium 109 is returned to the recording medium storage unit 108 by the recording medium transportation unit 107.

The recording medium storage unit 108 has position information for specifying a position of the recording medium, and the recording medium transportation unit 107 specifies the recording medium based on the position information indicated by the CPU.

The recording and reproducing units 110 and 111 are controlled by the CPU 102 of the library apparatus 101 so as to record data on the recording medium 109 and reproduce data from the recording medium 109. One of the recording and reproducing units 110 and 111 is exclusive for the front surface of the recording medium, and the other is exclusive for the rear surface of the recording medium. In order that the recording and reproducing units 110 and 111 may be exclusive for the front and rear surfaces, the recording and reproducing units with the same type are arranged, for example, in an opposite direction. Alternatively, the recording and reproducing unit exclusive for the front surface is the same as a general one, and the recording and reproducing unit exclusive for the rear surface may be different from a general one and have a particular configuration. Alternatively, a configuration may be reversed. FIG. 1 shows the recording and reproducing unit 111 aligning a light emission direction of laser light to a direction opposite to a light emission direction of laser light from the recording and reproducing unit 110 (see opposing dashed-line arrows), the lasers being used to record and reproduce data on and from the recording medium.

In FIG. 1, only two recording and reproducing units 110 and 111 are illustrated, and further three or more recording and reproducing units 110 and 111 may be built in the library apparatus 101. On this occasion, the number of the recording and reproducing units exclusive for the front surface may be different from that of the recording and reproducing units exclusive for the rear surface. For example, when a record is made on the front surface of the recording medium 109, the recording and reproducing units exclusive for the front surface more than the recording and reproducing units exclusive for the rear surface may be built in the library apparatus 101.

The recording medium transportation unit 107 is controlled by the CPU 102 of the library apparatus 101, and takes out the recording medium 109 from the recording medium storage unit 108 and transports it, thus loading it in the recording and reproducing units 110 and 111. Alternatively, the recording medium transportation unit 107 receives the recording medium 109 from the recording and reproducing units 110 and 111, and transports it, thus storing it in the recording medium storage unit 108. On this occasion, when a record or reproduction is performed on or from the front surface based on an instruction of the CPU 102 of the library apparatus 101, a recording medium is loaded in the recording and reproducing unit exclusive for the front surface. On the other hand, when a record or reproduction is performed on or from the rear surface, a recording medium is loaded in the recording and reproducing unit exclusive for the rear surface.

Based on a request from the server 103, the CPU 102 controls the recording medium transportation unit 107 and selects a desired recording medium from among a plurality of the recording media 109 stored in the recording medium storage unit 108, thus sending it to the recording and reproducing units 110 and 111. Further, the CPU 102 controls the recording medium transportation unit 107 and receives the recording medium 109 from the recording and reproducing units 110 and 111, thus storing it in a predetermined position of the recording medium storage unit 108. A reference numeral 106 denotes a memory, and various programs or information are recorded thereon. For example, a program or setting information for controlling the CPU 102 of the library apparatus 101 is also recorded on the memory 106.

Figure 2:
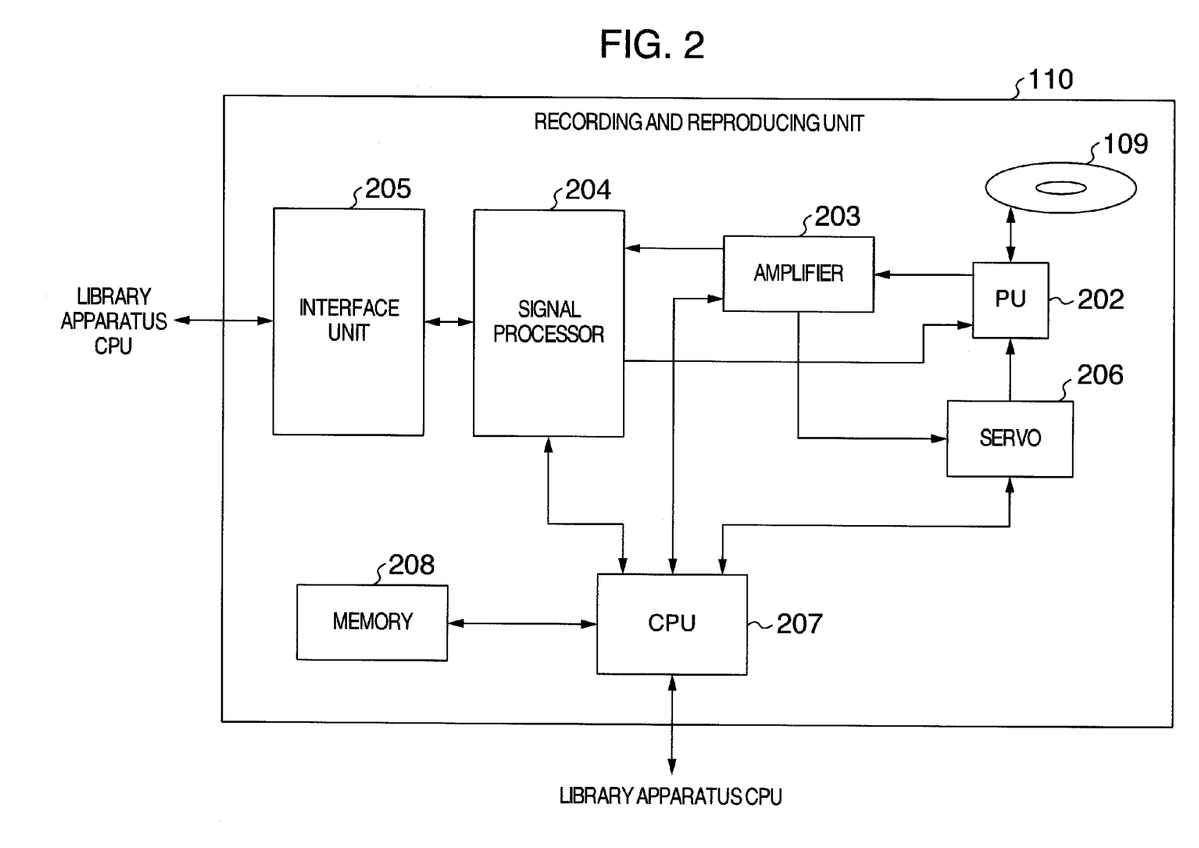
FIG. 2 is a block diagram illustrating a configuration of a recording and reproducing unit.

FIG. 2 is a block diagram illustrating a configuration of the recording and reproducing unit. The recording and reproducing unit 110 records data produced from the CPU 102 of the library apparatus 101 in the recording medium 109. The recording and reproducing unit 109 further supplies the data reproduced from the recording medium 109 to the CPU 102 of the library apparatus 101.

The CPU 207 of the recording and reproducing unit 110 controls recording and reproduction processes of the recording and reproducing unit 110. In place of the CPU 207, an arbitrary unit capable of the same control may be used. When starting a recording or reproduction process of the recording and reproducing unit 110, the CPU 207 starts collection of load information of each block managed by its own unit. When finishing a recording or reproduction process, the CPU 207 records the collected information in the memory and supplies the recorded information to the CPU 102 of the library apparatus 101.

When an optical disk is used as the recording medium 109, an optical disk drive is used as the recording and reproducing unit 110. In this case, an optical pickup 202 reads out a signal from the recording medium 201 and supplies it to an amplifier 203. The optical pickup 202 further records in the recording medium 201 a modulating signal produced from a signal processor 204. The amplifier 203 amplifies a reproduced signal read out from the recording medium 201 via the optical pickup 202 and supplies it to the signal processor 204. The amplifier 203 further generates a servo signal and supplies it to a servo unit 206.

The signal processor 204 demodulates an input signal and supplies to an interface unit 205 data in which error correction is performed. The signal processor 204 further adds an error-correcting code to the data produced from the interface unit 205 and modulates the added data, thus supplying the modulated data to the optical pickup 202. The interface unit 205 performs data transfer processing in accordance with a transfer system such as SATA (Serial Advanced Technology Attachment) and so on. At the time of data transfer, the interface unit 205 supplies the data produced from the signal processor 204 to the CPU 102 being a host device of the library apparatus 101. The interface unit 205 further supplies to the signal processor 204 the data produced from the CPU 102 being a host device of the library apparatus 101.

The memory 208 stores programs or various types of setting information for controlling the recording and reproducing unit 110 and medium information obtained from the recording medium. An example where the memory 208 is connected to the CPU 207 in the recording and reproducing unit 110 is illustrated, and further the memory 208 may be connected to any unit within or without the recording and reproducing unit 110. If keeping information, a memory need not be used as the memory 208, for example, a hard disk may be used. The servo unit 206 controls the optical pickup 202 by using a servo signal generated by the amplifier 203.

Through the recording and reproducing unit 110 having the above-described configuration, data is recorded on the recording medium 109 in accordance with an instruction from the CPU 102 of the library apparatus 101. Further, data is reproduced from the recording medium 109 and transferred to the CPU 102 of the library apparatus 101.

The recording and reproducing unit 110 is here described, and the recording and reproducing unit 111 also has the same configuration. Note that in the recording and reproducing units 110 and 111, one is set to be exclusive for the front surface of the recording medium and the other is set to be exclusive for the rear surface of the recording medium. A configuration of the recording and reproducing unit exclusive for the front surface may be the same as a general configuration, and a configuration of the recording and reproducing unit exclusive for the rear surface may be unique and different from a general configuration. Further, a configuration may be opposite to the above.

When three or more recording and reproducing units are built in the library apparatus 101, they also have the same configuration.

In the present embodiment, descriptions will be made based on the premise that the recording and reproducing unit 110 is exclusive for the front surface and the recording and reproducing unit 111 is exclusive for the rear surface.

Figure 3:
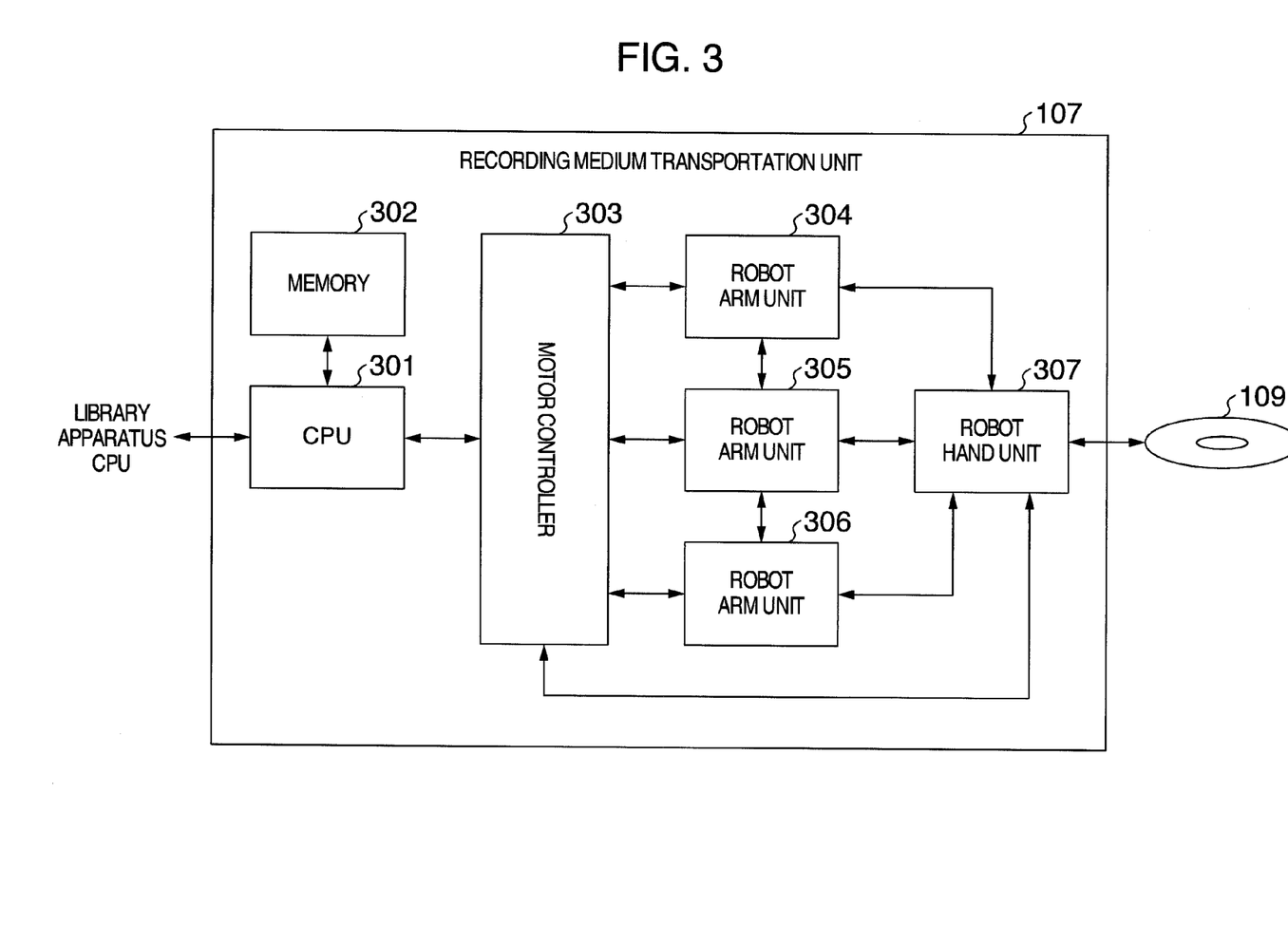
FIG. 3 is a block diagram illustrating a recording medium transportation unit.
Figure 4:
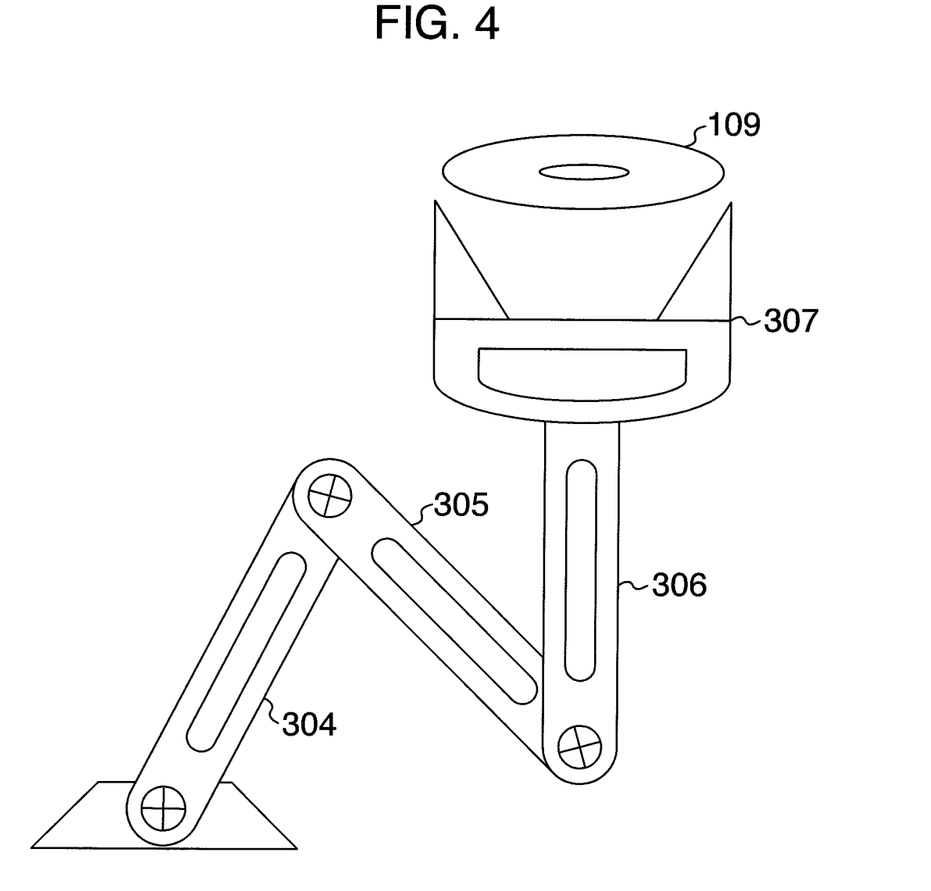
FIG. 4 is an external view of a recording medium transportation unit.

FIG. 3 is one example of a block diagram illustrating the recording medium transportation unit, and FIG. 4 is one example of an external view illustrating the recording medium transportation unit.

The CPU 301 controls the recording medium transportation unit 107. The memory 302 stores programs or various types of setting information for controlling the recording medium transportation unit 107. An example where the memory 302 is connected to the CPU 301 in the recording medium transportation unit 107 is illustrated, and further the memory 302 may be connected to any unit within or without the recording medium transportation unit 107. If keeping information, a memory needs not be used as the memory 302 and, for example, a hard disk may be used.

A motor controller 303 drives robot arm units 304, 305, and 306 based on an instruction from the CPU 301. The motor controller 303 further drives a robot hand unit 307. The robot arm units 304, 305, and 306 adjust a position of the robot hand unit 307 through rotary and straight-advancing motions such as forward and reverse movement.

The robot hand unit 307 is configured by a shape capable of holding the recording medium 109 without damaging it, and delivers and receives the recording media to and from the recording medium storage unit 108 and the recording and reproducing units 110 and 111.

Through the recording medium transportation unit 107 having the above-described configuration, the recording medium 109 is transported between the recording medium storage unit 108 and the recording and reproducing units 110 and 111 in accordance with an instruction from the CPU 102 of the library apparatus 101.

An example where one recording medium transportation unit is provided in the library apparatus is here illustrated, and further a plurality of recording medium transportation units may be provided therein. Further, a shape of the recording medium transportation unit is not limited to an example of FIG. 4 and, for example, the recording medium may be fixed by using a central hole of the recording medium for transportation.

Figure 5:
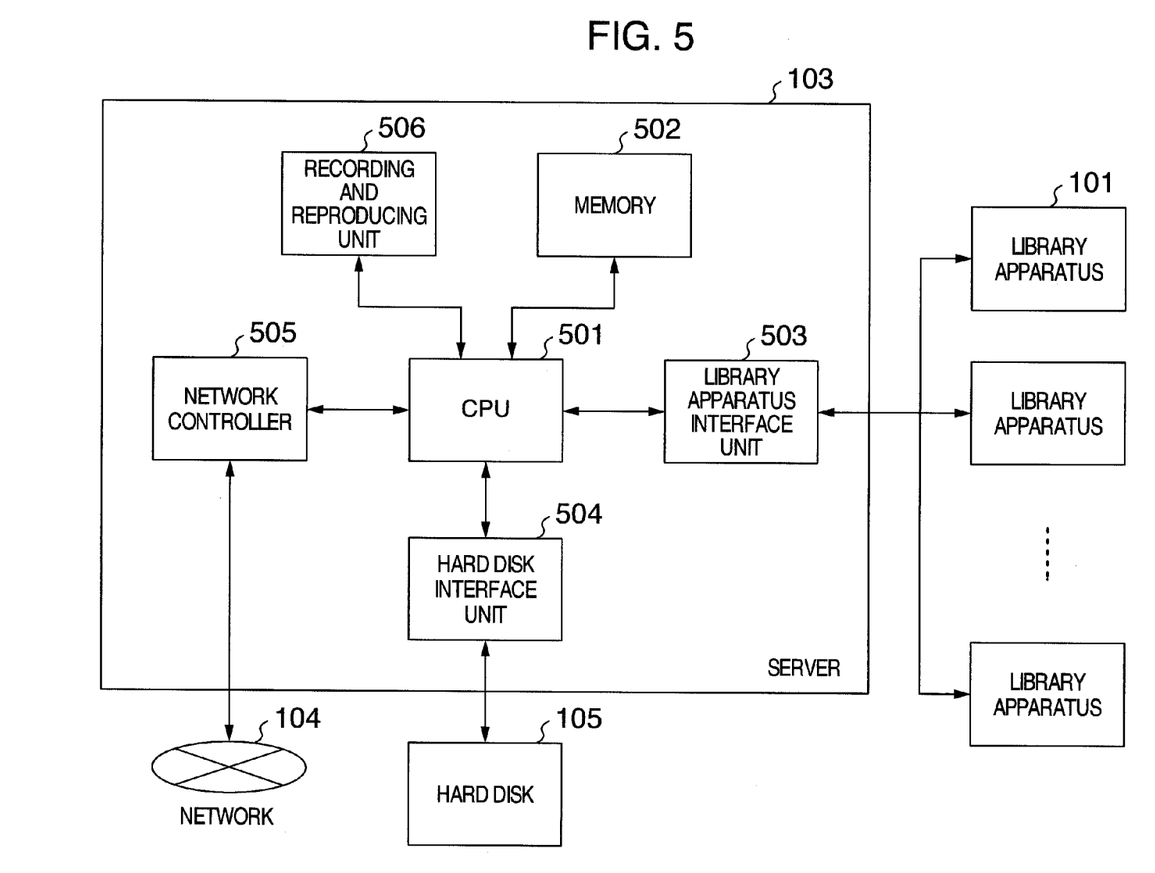
FIG. 5 is a block diagram illustrating a configuration of a server.

FIG. 5 is a block diagram illustrating a configuration of the server 103. The server 103 is connected to one or more library apparatus 101, hard disk 105, and network 104.

The server 103 provides for the library apparatus 101 services centering on recording and reproduction of data, and at the same time, performs recording and reproduction of data to the hard disk 105 and performs transmission and reception or management of data through the network 104.

At the time of recording data, the CPU 501 of the server 103 records data received from the network 104 via a network controller 505 on the hard disk 105 via a hard disk interface unit 504. Alternatively, the CPU 501 controls the library apparatus 101 via a library apparatus interface unit 503 and records the data on a recording medium built in the library apparatus 101.

At the time of reproducing data, the CPU 501 reads out data from the hard disk 105 via the hard disk interface unit 504 and transmits the read-out data to the network 104 via the network controller 505. Or, alternatively, the CPU 501 controls the library apparatus 101 via the library apparatus interface unit 503, reproduces the data from the recording medium built in the library apparatus 101, receives the reproduced data, and transmits the received data to the network 104 via the network controller 505. Alternatively, the CPU 501 appropriately processes, records, manages, and reproduces a variety of information received from the library apparatus 101. The CPU 501 further determines a control policy based on the reproduced information, and applies actual control.

The memory 502 stores programs and a variety of information for controlling the CPU 501 of the server 103. The library apparatus interface unit 503 applies control about data transmission and reception between the library apparatus 101 and the CPU 501 of the server 103. In FIG. 5, a plurality of the library apparatus are connected to one library apparatus interface unit, and further, for example, a plurality of the library apparatus may be connected thereto via a network. The hard disk interface unit 504 performs data transfer in accordance with specifications of the hard disk 105 and SATA. The network controller 505 applies control about data transmission and reception between the network 104 and the CPU 501 of the server 103.

In the library apparatus 101 according to the present embodiment, when treating a double-sided readable/writable recording medium, a direction of the recording medium, namely, the front or rear surface thereof needs to be discriminated at the time of reading and writing data from and in the recording medium previously stored in the recording medium storage unit. The reason is that a user does not recognize a direction of the recording medium to load it in the recording and reproducing unit but the recording medium transportation unit performs this operation.

To identify front and rear surfaces of the recording medium, for example, the library apparatus 101 or recording and reproducing unit 110 provides identification data about the front and rear surfaces on the management information each recorded on the front and rear surfaces of the recording medium for identification. When an optical disk is used as the recording medium and an optical disk drive is used as the recording and reproducing unit, the identification data about the front or rear surface may be provided on a BCA (Burst Cutting Area) or a user data area. In addition, information may be stored in an area read out by the CPU of the library apparatus 101 or recording and reproducing unit 110.

Further, it is important to determine an order as to whether a record is first made on which of the front and rear surfaces of the recording medium. Suppose, for example, that when an order of recording is determined, continuous data striding over both surfaces of the recording medium is recorded. In this case, when the data is reproduced, even if the front and rear surfaces are reproduced in reverse, desired data can be taken out.

Think of a case where in the double-sided readable/writable recording medium, identification data about the front or rear surface is previously provided on each surface at the time of factory shipment. The recording and reproducing unit 110 may determine the front or rear side by using the above-described information. However, when the information is stored in the recording medium storage unit 108, directions of all the recording media are not necessarily the same. When the recording medium is loaded as an unrecorded recording medium in the recording and reproducing unit 110, the above is considered and recording is started using as the front surface its surface regardless of the identification data about the front or rear surface provided at the time of factory shipment. That is to say, the rear surface is not reversed but treated as the front surface hereafter. For that purpose, in addition to the existing identification data about the front or rear surface, other identification data about the front or rear surface is newly provided on the recording medium.

For example, the new identification data about the front or rear surface is stored in a management information area of the recording medium through the recording and reproducing unit 110. Alternatively, the existing identification data may be overwritten. Alternatively, the new identification data about the front or rear surface may be stored in the outside of the recording medium, such as a memory built in the library apparatus 101, a memory built in the recording and reproducing unit 110, or a hard disk.

When the recording medium has the new identification data about the front or rear surface, the library apparatus 101 or recording and reproducing unit 110 ignores the existing identification data about the front or rear surface.

When the identification data about the front or rear surface is not originally provided on the recording medium, a direction in which an unrecorded recording medium is first loaded in the recording and reproducing unit 110 is hereafter treated as the front surface, and its opposite direction is treated as the rear surface. For that purpose, identification data is previously provided in the same manner as in the recording medium having the identification data about the front or rear surface.

The recording and reproducing unit 110 identifies a direction of the loaded recording medium. As a result, when a direction of the recording medium is opposite, the recording medium needs to be taken out once, the direction needs to be reversed, and an operation to be loaded again needs to be ordinarily performed in order to change the direction. To solve the above-described problem, in the present embodiment, two types of the recording and reproducing units which are exclusive for the front and rear surfaces of the recording medium are provided. The recording and reproducing unit exclusive for the rear surface is further arranged, for example, in a direction opposite to the same type of the recording and reproducing unit exclusive for the front surface. Alternatively, the recording and reproducing unit exclusive for the rear surface has a configuration different from that of the recording and reproducing unit exclusive for the front surface, and the above process permits a reverse operation of the recording medium to be eliminated.

In addition to the above, a direction in which an unrecorded recording medium is first loaded in the recording and reproducing unit is treated as the front surface, and its opposite direction is treated as the rear surface.

Through the above processes, until the recording medium is loaded in the recording and reproducing unit from the recording medium storage unit, the recording medium can be used without reversal.

Figure 6:
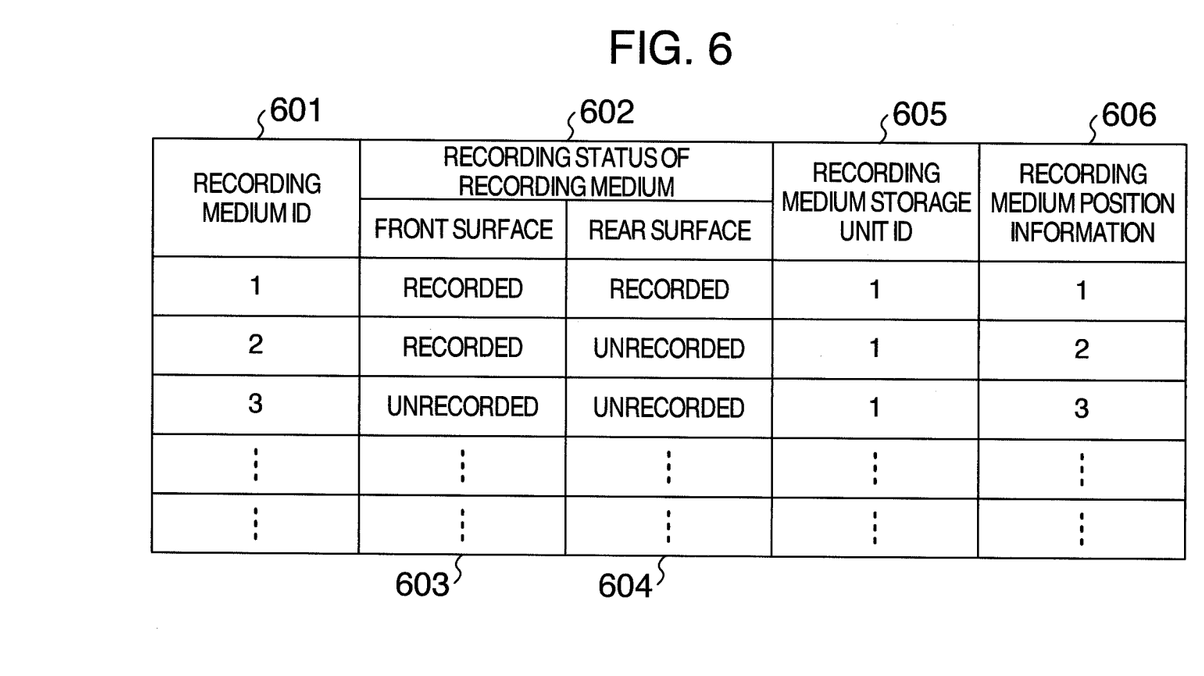
FIG. 6 is an information table of a recording medium.

FIG. 6 illustrates an information table of the recording medium. In the information table of the recording medium, a recording medium ID 601, a status of the front surface 603 and a status of the rear surface 604 as a recording status of the recording medium 602, a recording medium storage unit ID 605, and recording medium position information 606 are included.

The information table of the recording medium may be stored in a memory of the library apparatus 101, or a memory of the recording and reproducing units 110 and 111. Further, the information table may be stored in any area of the unit capable of storing information such as a memory of the server or a hard disk.

According to a command from the CPU 102 of the library apparatus 101, the recording medium transportation unit 107 takes out the specified recording medium from the recording medium storage unit 108, and loads it in the specified recording and reproducing unit. On this occasion, the recording medium transportation unit 107 uses the recording medium ID 601 to specify the recording medium. When considering that a plurality of the recording medium storage units 108 are provided, the recording medium transportation unit 107 uses the recording medium storage unit ID 605 to specify the recording medium storage unit 108. The recording medium transportation unit 107 further uses the recording medium position information 606 to specify position information of the recording medium in the specified recording medium storage unit 108.

When the recording medium is unrecorded, information indicating that it is unrecorded is stored in the recording status of the recording medium 602. On the other hand, when the recording medium is recorded, information indicating that it is recorded is stored therein. The recording status of the recording medium 602 further has information about the status of the front surface 603 and the status of the rear surface 604, respectively.

Figure 7:
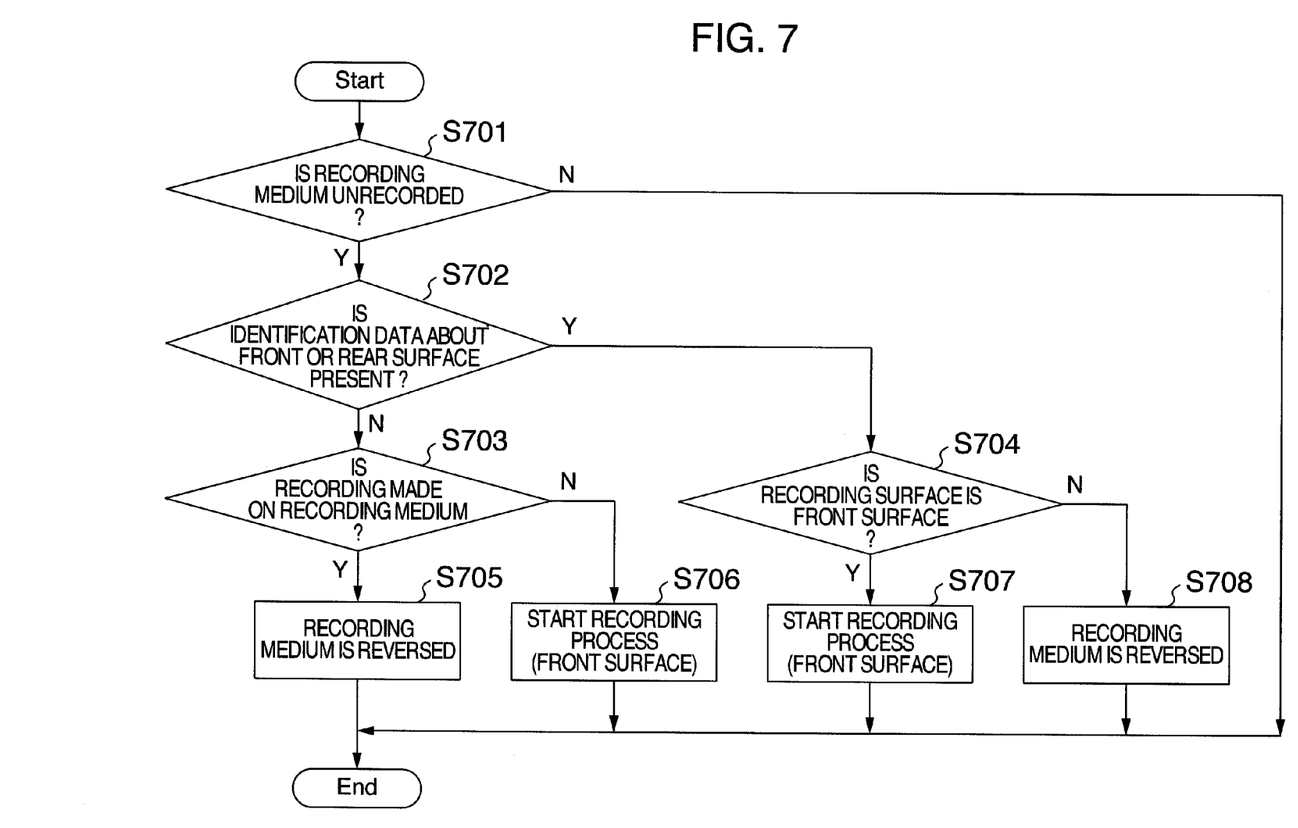
FIG. 7 is a flowchart of a process performed at the time of making a record on a front surface of a recording medium.

FIG. 7 illustrates a flowchart of a process performed at the time of making a record on the front surface of the recording medium.

After the recording medium is loaded in the recording and reproducing unit 110 exclusive for the front surface, the recording and reproducing unit 110 confirms whether the recording medium is unrecorded (S701). If not, the recording and reproducing unit 110 notifies the CPU 102 of the library apparatus 101 that the recording medium is recorded. If so, the recording and reproducing unit 110 then confirms whether the identification data about the front or rear surface is present (S702). If not, the recording and reproducing unit 110 obtains the recording medium ID of the recording medium, and confirms through this recording medium ID whether there is a history in which the recording is made on the recording medium before now (S703). If so, data is recorded on a surface opposite to that of the recording medium, and therefore the recording surface is obviously the rear surface. The reason is that the recording medium in which the recording is made only on the front surface is once taken out from the recording medium storage unit 108 due to some reason, and when the recording medium is inserted again, it is erroneously reversed. Accordingly, the recording and reproducing unit 110 notifies the CPU 102 of the library apparatus 101 that the recording surface is reversed, and ends the process (S705).

If not at step S703, the recording and reproducing unit 110 determines that the recording surface is the front surface, and starts a recording process of data (S706). When the recording process of data is normally finished, the recording and reproducing unit 110 changes a recording history of the recording medium from unrecorded to recorded states.

If so at step S702, the recording and reproducing unit 110 obtains the information from the recording medium and confirms whether the recording surface is the front surface (S704). If so, the recording and reproducing unit 110 starts the recording process (S707). When the recording process of data is normally finished, the recording and reproducing unit 110 changes a recording history of the recording medium from unrecorded to recorded states.

If not at step S704, the recording and reproducing unit 110 performs the same process as that of step S705.

Figure 8:
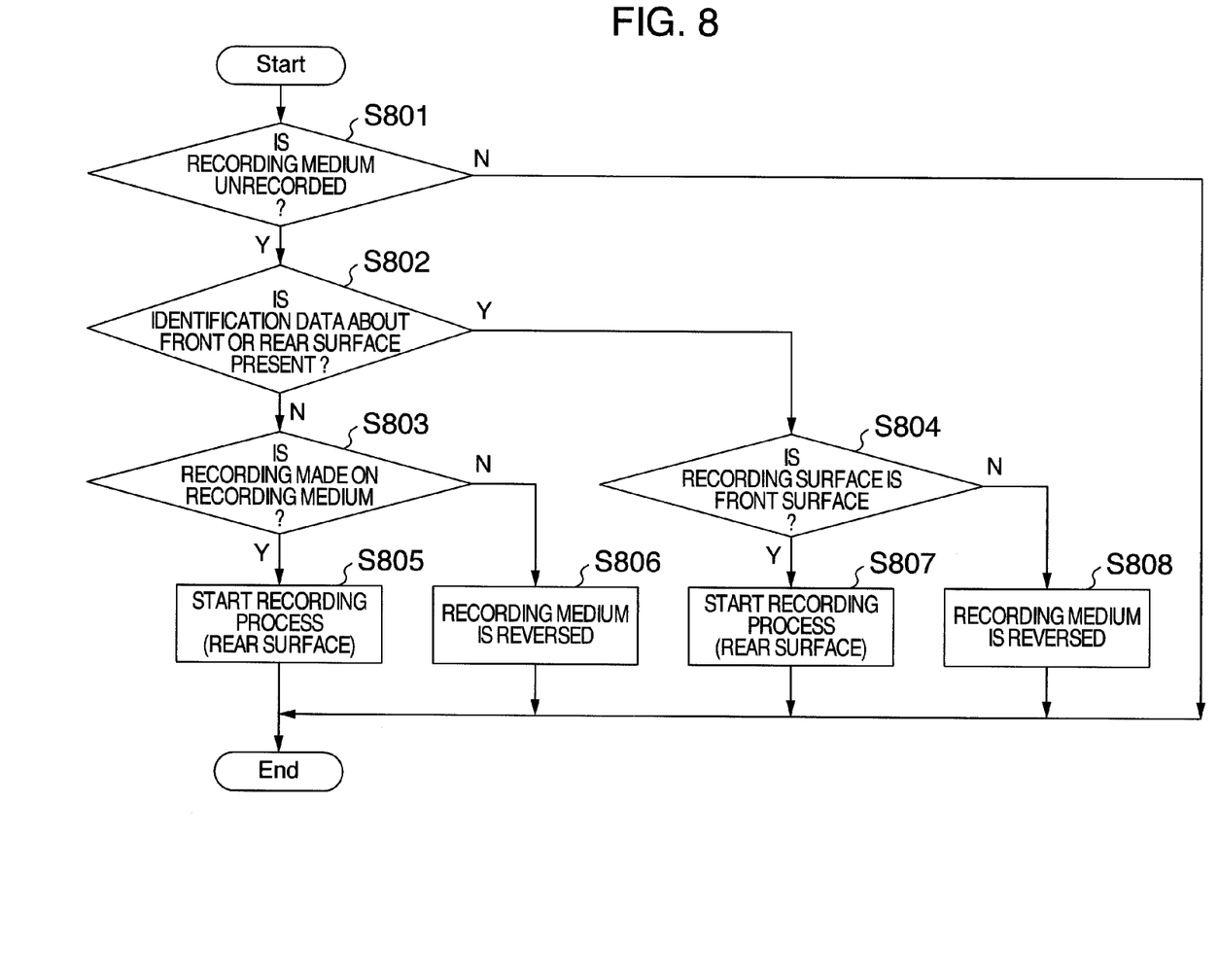
FIG. 8 is a flowchart of a process performed at the time of making a record on a rear surface of a recording medium.

FIG. 8 illustrates a flowchart of a process performed at the time of making a record on the rear surface of the recording medium.

After the recording medium is loaded in the recording and reproducing unit 111 exclusive for the rear surface, the recording and reproducing unit 111 confirms whether the recording medium is unrecorded (S801). If not, the recording and reproducing unit 111 notifies the CPU 102 of the library apparatus 101 that the recording medium is recorded. If so, the recording and reproducing unit 111 then confirms whether the identification data about the front or rear surface is present (S802). If not, the recording and reproducing unit 111 obtains the recording medium ID of the recording medium, and confirms through this recording medium ID whether there is a history in which the recording is made on the recording medium before now (S803). If so, data is recorded on a surface opposite to that of the recording medium, and therefore the recording surface is obviously the rear surface. Accordingly, the recording and reproducing unit 111 starts the recording process of data (S805). When the recording process of data is normally finished, the recording and reproducing unit 111 changes a recording history of the recording medium from unrecorded to recorded states.

If not at step S803, the recording and reproducing unit 111 determines that the recording surface is the front surface. The reason is that the recording medium in which the front surface is also unrecorded is once taken out from the recording medium storage unit 108 due to some reason, and when the recording medium is inserted again, it is erroneously reversed. Accordingly, the recording and reproducing unit 111 notifies the CPU 102 of the library apparatus 101 that a state of the recording medium is abnormal, and ends the process (S806).

If so at step S802, the recording and reproducing unit 111 obtains the information from the recording medium and confirms whether the recording surface is the rear surface (S804). If so, the recording and reproducing unit 111 starts the recording process (S807). When the recording process of data is normally finished, the recording and reproducing unit 111 changes a recording history of the recording medium from unrecorded to recorded states.

If not at step S804, the recording and reproducing unit 111 performs the same process as that of step S806.

Even if a direction of an unrecorded recording medium loaded in the recording and reproducing unit is opposite, the recording medium can be directly used without reversal. Through the above process, useless processes of taking out, reversing, and loading the recording medium again are saved and the process is rapidly advanced by just that much. Further, since a direction of the recording medium need not be reversed, a mechanism for reversing the recording medium is eliminated in the recording medium transportation unit or in units other than the same. Through the above process, a space necessary for a reversal mechanism is eliminated, and therefore the library apparatus is made small. As a method for recording and reproducing data on and from the recording medium capable of recording and reproducing data on and from both surfaces, two pickups are provided in one recording and reproducing unit. Since laser light is irradiated from both of the pickups, data is capable of being recorded and reproduced on and from both surfaces; however, the recording and reproducing unit has a particular and complicated configuration. As compared with the above, the present embodiment has a configuration in which a conventional recording and reproducing unit is used. Further, it goes without saying that the method exerts a further effect that reallocation of addresses of the recording medium is also unnecessary.

Reproduction is performed by the recording and reproducing unit exclusive for each of the front and rear surfaces on which data is recorded. That is, data is not reproduced by a recording and reproducing unit different from that at the time of recording. Therefore, occurrence of errors can be reduced due to a difference of the recording and reproducing units.

In addition, the present invention is not limited to the above-described embodiments, but includes various modifications. For example, the above-described embodiments are described in detail in order to clearly describe the present invention, and are not necessarily limited to the library apparatus having all the described constructions. Further, a part of configurations according to one embodiment can be replaced by those according to other embodiments, and the configurations according to other embodiments can be added to that according to one embodiment. Further, an addition, deletion, or replacement of the configurations according to other embodiments can be performed by using a part of the configurations according to each embodiment.

A part or all of the respective structures, functions, processing units, and processing approaches may be realized by hardware by designing through the integrated circuit, for example. Those structures, functions and the like may be realized by software by interpreting and executing the program for realizing the respective functions through a processor. Information with respect to the program, table, and file for realizing the respective functions may be stored in the recording unit such as the memory, hard disk, and SSD (Solid State Drive), or the recording medium such as the IC card, SD card, and DVD.

The examples show the control line and information line considered as necessary for the explanation, which does not necessarily show all the control lines and information lines of the product. Actually, almost all the components may be considered to be connected with one another.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A library apparatus comprising:
a plurality of recording media having recording surfaces on both surfaces;
a recording medium storage unit configured to store the plurality of recording medium;
a first recording and reproducing unit configured to record and reproduce data on and from a recording medium;
a second recording and reproducing unit configured to arrange a laser so as to align a light emission direction of laser light to a direction opposite to a light emission direction of laser light from the first recording and reproducing unit, and record and reproduce data on and from the recording medium;
a recording medium transportation unit configured to transport and transfer the recording medium between the recording medium storage unit and one of the first and second recording and reproducing units; and a controller configured to control the recording medium transportation unit and the recording and reproducing unit, wherein;

if recording or reproduction is performed on or from one surface of the recording medium, the controller controls the recording medium transportation unit so as to transfer the recording medium to the first recording and reproducing unit; and if recording or reproduction is performed on or from the other surface of the recording medium, the controller controls the recording medium transportation unit so as to transfer the recording medium to the second recording and reproducing unit;

wherein for a loaded recording medium which is first loaded and both recording surfaces of which are unrecorded, the first or second recording and reproducing unit determines a front or rear surface of the loaded recording medium based upon a direction of the loaded recording medium; and wherein the first or second recording and reproducing unit records identification data regarding to identification of the front or rear surface determined by the direction of the loaded recording medium onto the loaded recording medium which is first loaded and both surfaces of which are unrecorded.

2. The library apparatus according to claim 1, wherein the controller holds, in a storage unit, recording state information indicating that each recording surface of the front and rear surfaces of the recording medium is recorded or unrecorded.

3. The library apparatus according to claim 2, wherein for the recording medium loaded in the first or second recording and reproducing unit and the recording surfaces of which are unrecorded, the controller refers to the recording state information stored in the storage unit and determines whether the recording medium is reversed.

4. The library apparatus according to claim 1, wherein the first or second recording and reproducing unit includes two types of recording and reproducing units, a recording and reproducing unit which records and reproduces data on and from only a recording surface being a front surface of the recording medium and a recording and reproducing unit which records and reproduces data on and from only a recording surface being a rear surface of the recording medium.

5. A recording and reproducing system comprising a server and a library apparatus, wherein the server comprises:

an information storing medium storing data; and a library apparatus interface unit carrying out transmission and reception of data with the library apparatus;

wherein the library apparatus comprises:

a plurality of recording media having recording surfaces on both surfaces;

a recording medium storage unit configured to store the plurality of recording medium;

a first recording and reproducing unit configured to record and reproduce data on and from a recording medium;

a second recording and reproducing unit configured to arrange a laser so as to align a light emission direction of laser light to a direction opposite to a light emission direction of laser light from the first recording and reproducing unit, and record and reproduce data on and from the recording medium;

a recording medium transportation unit configured to transport and transfer the recording medium between the recording medium storage unit and one of the first and second recording and reproducing units; and a controller configured to control the recording medium transportation unit and, the recording and reproducing unit;

wherein;

if recording or reproduction is performed on or from one surface of the recording medium, the controller controls the recording medium transportation unit so as to transfer the recording medium to the first recording and reproducing unit; and if recording or reproduction is performed on or from the other surface of the recording medium, the controller controls the recording medium transportation unit so as to transfer the recording medium to the second recording and reproducing unit;

wherein for a loaded recording medium which is first loaded and both recording surfaces of which are unrecorded, the first or second recording and reproducing unit determines a front or rear surface of the loaded recording medium based upon a direction of the loaded recording medium; and wherein the first or second recording and reproducing unit records identification data regarding to identification of the front or rear surface determined by the direction of the loaded recording medium onto the loaded recording medium which is first loaded and both surfaces of which are unrecorded.

6. The recording and reproducing system according to claim 5, wherein the server holds, in the information storing medium, recording state information indicating that each recording surface of the front and rear surfaces of the recording medium is recorded or unrecorded.

7. The recording and reproducing system according to claim 6, wherein for the recording medium loaded in the first or second recording and reproducing unit and the recording surfaces of which are unrecorded, the controller refers to the recording state information stored in the information storing medium on the server and determines whether the recording medium is reversed.

* * * * *